United States Patent
Ho et al.

(10) Patent No.: US 10,199,859 B2
(45) Date of Patent: Feb. 5, 2019

(54) UNINTERRUPTIBLE POWER SUPPLY SYSTEM WITH PRECHARGE CONVERTER

(71) Applicant: ABB Schweiz AG, Baden (CH)

(72) Inventors: Carl Ngai-Man Ho, Giubiasco (CH); Esa-Kai Paatero, Helsinki (FI); Nicola Notari, Gentilino (CH)

(73) Assignee: ABB Schweiz AG, Baden (CH)

( * ) Notice: Subject to any disclaimer, the term of this patent is extended or adjusted under 35 U.S.C. 154(b) by 73 days.

(21) Appl. No.: 15/369,502

(22) Filed: Dec. 5, 2016

(65) Prior Publication Data

US 2017/0085124 A1     Mar. 23, 2017

Related U.S. Application Data (63) Continuation of application No. PCT/EP2015/062382, filed on Jun. 3, 2015.

(30) Foreign Application Priority Data

Jun. 3, 2014  (EP) ..................................... 14170991

(51) Int. Cl.
  *H02J 7/00*   (2006.01)
  *H02J 9/06*   (2006.01)
(52) U.S. Cl.
  CPC ............ *H02J 9/061* (2013.01); *H02J 7/0068* (2013.01); *H02J 9/06* (2013.01)
(58) Field of Classification Search
  None
  See application file for complete search history.

(56) References Cited

U.S. PATENT DOCUMENTS 6,100,605 A     8/2000  Zajkowski
6,262,899 B1    7/2001  Raddi et al.
(Continued)

FOREIGN PATENT DOCUMENTS

WO    2005101634 A1    10/2005

OTHER PUBLICATIONS

European Patent Office, International Search Report & Written Opinion issued in corresponding Application No. PCT/EP2015/062382, dated Aug. 17, 2015, 9 pp.

(Continued)

*Primary Examiner* — Jared Fureman
*Assistant Examiner* — Joel Barnett
(74) *Attorney, Agent, or Firm* — J. Bruce Schelkopf; Taft Stettinius & Hollister LLP (57) ABSTRACT

An uninterruptable power supply system is disclosed with a precharge converter for connecting to a DC link of the uninterruptable power supply system to a DC power supply, whereby the DC link comprises a first and a second DC bus line, which are both coupled to a common reference point, whereby the common reference point can be an AC power supply neutral of the uninterruptable power supply system, comprising power connectors for connecting to the DC power supply, a first and second output connector for connecting to the first and the second DC bus line, respectively, a converter circuit for receiving DC power from the power connectors and providing DC power to the first and second output connector, and a control unit for controlling operation of the converter circuit.

22 Claims, 6 Drawing Sheets

(56) References Cited

U.S. PATENT DOCUMENTS

| | | | | |
|---|---|---|---|---|
| 6,420,850 B1* | 7/2002 | Thurman | ............... | H02J 9/06 |
| | | | | 320/130 |
| 7,202,576 B1* | 4/2007 | Dechene | ............... | H02J 9/06 |
| | | | | 307/66 |
| 2002/0109412 A1 | 8/2002 | Johnson, Jr. | | |
| 2002/0118556 A1* | 8/2002 | Johnson, Jr. | ........... | H02J 9/061 |
| | | | | 363/123 |
| 2005/0213357 A1* | 9/2005 | Paatero | ............... | H02J 9/062 |
| | | | | 363/95 |
| 2008/0246340 A1* | 10/2008 | Swisher | ............ | H02J 7/0022 |
| | | | | 307/66 |
| 2013/0049699 A1* | 2/2013 | Jayaraman | ............ | H02M 1/10 |
| | | | | 320/137 |
| 2015/0295421 A1* | 10/2015 | Blakemore | ........... | H02J 7/007 |
| | | | | 320/129 |

OTHER PUBLICATIONS

European Patent Office, Extended Search Report issued in corresponding Application No. 14170991.5, dated Dec. 4, 2014, 4 pp.

* cited by examiner

UNINTERRUPTIBLE POWER SUPPLY SYSTEM WITH PRECHARGE CONVERTER

TECHNICAL FIELD

The present invention relates to the field of uninterruptible power supplies (UPS).

BACKGROUND ART

Uninterruptible power supplies, which are typically abbreviated by UPS, take over power supply of different kinds of electric system in case of failure of a power mains supply, which provides power to the electric system in normal operation. Accordingly, the UPS comprises an AC power source, which can provide power to the electric system in case of failure of the power mains supply or the AC power grid. The failure of the power mains supply can be a complete shutdown, or merely a partial failure, e.g. when only a power level below the power required for the electric system can be provided.

The UPS typically comprises a system controller, which activates and controls the supply of power from an alternate AC power source to the electric system. The system controller is typically DC driven and powered from the AC power source, e.g. via a rectifier. This DC power supply is also referred to as DC bus.

A typical UPS includes one or more storage capacitors coupled to the DC link. Since large capacitors are typically used in the DC link, power-up of the UPS can result difficult. Some on-line UPSs use a boost rectifier, which allows the DC voltage on the DC link to be boosted to levels greater than the peak AC input voltage. However, a potential problem with using such a boost rectifier in combination with a large storage capacitor is that undesirably large inrush currents may be produced when the rectifier is coupled to an AC source such as a AC power gird. In particular, in a boost mode converter, the DC link storage capacitors may initially act as a short-circuited load to the utility through the boost converter.

A precharge system may be used to pre-charge the DC link to a voltage close to or preferably above the utility peak voltage at start-up. Common approaches include using a power resistor that is coupled to the DC link with or without a series control device, such as a relay, to precharge the DC link from the AC power supply. However, conventional precharge techniques provide a long and/or difficult to scale pre-charge time or, conversely, require the use of components that are bulky and expensive and may not be economical to assemble.

In order to enable a reliable power-up of the UPS in the case of an AC power absent environment, a dedicated power supply is used for the start-up phase, so that the UPS can be started also e.g. in the case of a blackout of the AC power grid without problems.

DISCLOSURE OF INVENTION

It is an object of the present invention to provide an uninterruptible power supply with a precharge converter, which enables an efficient and secure start-up of the uninterruptible power supply system with simple means.

This object is achieved by the independent claim. Advantageous embodiments are given in the dependent claims.

In particular, the present invention provides an uninterruptible power supply system comprising an AC power source connection for providing AC input power by an AC power source to the uninterruptible power supply system, a DC link, which comprises a first and a second DC bus line, which are both coupled to a common reference point, where the common reference point is connectable to the AC power source neutral, a DC power supply connection connectable to a DC energy storage, a primary DC-DC converter for transferring power between the DC energy storage and the DC link, and wherein a precharge converter with power connectors on its input side, which power connectors are connected to the DC power supply connection, and with a first and second output connector connected to the first and the second DC bus line, the precharge converter further comprises a converter circuit for receiving DC power from the power connectors and providing DC power to the first and second output connector, and a control unit for controlling operation of the converter circuit, wherein one power connector of the power connectors is connected to the common reference point, and the converter circuit is controlled by the control unit to provide power to the output connectors at the same time with reference to the common reference point.

The basic idea of the invention is to provide a simple converter for powering the DC link by means of a single DC power supply which is implemented as the precharge converter. Hence, the UPS system can power-up by use of the precharge converter only. Accordingly, the UPS systems can start operation even in an AC power absent environment, e.g. in the case of black out, where the AC power source such as the AC power grid is not operating. Based on the common reference point, which is preferable neutral of the AC power source, common mode voltages at the DC power supply connection can be avoided.

The precharge converter is adapted in particular to the needs of a UPS system including one or more storage capacitors coupled to the DC link. Preferably, at least one storage capacitor is coupled between the common reference point and each DC bus line.

With the UPS system of the invention with the precharge converter, the use of e.g. bulky and expensive power resistors for coupling to the DC link can be omitted, and assembly of the UPS system and the precharge converter is kept simple.

The converter circuit of the precharge converter receives DC power via the power connectors and provides DC power to the first and second output connectors. Thereby, the DC link can be powered for start-up of the UPS system.

The control unit of the precharge converter controls the operation of the converter circuit to provide power to the two output connectors of the precharge converter at the same time. Accordingly, the power for powering the DC link can already be provided in an efficient manner, so that the UPS system can be ready for use in a short time. Providing power to the two output connectors at the same time refers to a simultaneous power supply, whereby pulse control can be used to provide the energy simultaneously.

The output connectors for connection to the DC bus lines are both coupled to the common reference point. The common reference point can be an AC power source neutral of the uninterruptable power supply. Hence, the common reference point can be a neutral wire of an AC power source, i.e. the AC power source is a 3-phase 4-wire power source such as a 4-wire AC power grid . Alternatively, the AC power source is provided without a neutral wire as a 3-phase 3-wire power source, whereby the UPS system has one common point voltage, which is the middle point of the DC-link.

The AC power source can be an AC power grid. The AC power source typically provides power also for internal use of the UPS system in operation.

The precharge converter is typically not active during normal operation, it is active for starting up the UPS system only, so that the UPS system can be started in an efficient and well-controlled way.

The precharge converter can comprise a reference output terminal for the common reference point. Accordingly, the reference output terminal can be connected internally to the power connector, which is connected to the common reference point. Nevertheless, since one power connector is already connected to the common reference point, the reference point can also be provided externally.

According to a modified embodiment of the invention the converter circuit comprises at least one semiconductor switch in series with an inductor element, and the control unit is adapted to control the at least one semiconductor switch in series with the inductor element to perform pulse width modulation switching. Accordingly, with the pulse width modulation (PWM), a simple means for efficiently provisioning power is provided. Different output voltages can be easily provided using PWM.

According to a modified embodiment of the invention the converter circuit comprises two semiconductor switches, one inductor element, and a first and a second diode, whereby the two semiconductor switches and the inductor element are connected in series with the inductor element connected between the two semiconductor switches, the first diode connects a first terminal of the inductor element with the first output connector, the second diode connects a second terminal of the inductor element with the second output connector, and the first and second output connector are charged with energy at the same time by the inductor element. This setup of the converter circuit uses simple means for powering the DC link via the output connectors.

According to a modified embodiment of the invention the converter circuit comprises at least one semiconductor switch, a high frequency transformer having one primary coil and at least one secondary coil, and at least one diode, whereby the at least one semiconductor switch and the primary coil of the high frequency transformer are connected in series, the at least one diode connects the at least one secondary coil with the first output connector, and/or the at least one diode connects the at least one secondary coil with the second output connector, the first and second output connector are charged with energy at the same time by the high frequency transformer. The high frequency transformer enables a galvanic separation of the output connectors and the power connectors. Furthermore, simple means are used in the converter circuit for powering the DC link via the output connectors.

In a further modified embodiment, the converter circuit comprises two semiconductor switches, a high frequency transformer having one primary coil and two secondary coils, and a first and a second diode, whereby the two semiconductor switches and a primary coil of the high frequency transformer are connected in series with the primary coil connected between the two semiconductor switches, the first diode connects a first of the secondary coils with the first output connector, the second diode connects a second of the secondary coils with the second output connector, the first and second output connector are charged with energy at the same time by the inductor element.

According to a modified embodiment of the invention the converter circuit comprises a first and a second DC-DC converter, whereby the first DC-DC converter is connected to the first output connector, and the second DC-DC converter is connected to the second output connector. With the two DC-DC converters, each output connector can be provided individually with power, thereby providing a high range of possible power ranges. In particular, the voltages at the output connectors can be adapted by the two DC-DC converters. Different types of DC-DC converters can be used depending on individual needs of the UPS system.

According to a modified embodiment of the invention the first DC-DC converter is a buck converter. A buck converter is a voltage step down and current step up converter. Buck converters are generally known to a person skilled in the Art and can be provided with a high efficiency of 95% or higher.

According to a modified embodiment of the invention the second DC-DC converter is a buck-boost converter. The buckboost converter is a type of DC-DC converter that has an output voltage magnitude that is either greater than or less than the input voltage magnitude, thereby providing a high level of flexibility for use.

According to a modified embodiment of the invention the control unit is connected to the power connectors for receiving operational power. Hence, no additional power has to be provided for operation of the precharge converter.

According to a modified embodiment of the invention the converter circuit is adapted to provide positive DC power to the first output connector and negative DC power to the second output connector. Hence, the common reference point can provide e.g. a zero voltage in respect to the two output connectors.

According to a modified embodiment of the invention the DC energy storage comprises a battery. The battery enables operation independent from other power sources, which depend on external provisioning of the power. Hence, the UPS system can start-up in an AC power absent environment, e.g. in case of black out. Accordingly, the common reference point refers to a connection of a neutral wire of the AC power source connection to one voltage of the battery, thereby avoiding a common mode voltage at the battery. Typically, battery minus will be connected to the common reference point.

According to a modified embodiment of the invention the DC power supply connection comprises a rectifier, which is connected to the AC power source connection. The rectifier can be used to power the precharge converter directly from the AC power source. Hence, no other means for providing power are required, e.g. a battery. In a modified embodiment, the DC power source comprises a battery as well as a rectifier connected to the AC power source, thereby providing a redundant power supply. Alternatively, the battery can be chosen small, when the precharge converter can be powered via the rectifier from the AC power source, e.g. when the precharge converter is powered only at the beginning of operation by the battery and afterwards via the rectifier from the AC power source.

According to a modified embodiment of the invention the uninterruptible power supply system comprises a system controller for controlling the operation of the uninterruptible power supply system, whereby the control unit of the precharge converter is provided separately from the system controller. Hence, the control devices to control the operation of the converter circuit as well as the operation of the overall UPS system are independent, which facilitates start-up of the ups system. Accordingly, power consumption at start-up can be limited to the power consumption of the control unit. The system controller typically monitors a connected electric device, for which the UPS system is provided, or the power mains directly in order to detect a failure of the power mains, and controls the supply of power from the AC power source to the electric device. Alternatively, the system controller receives an input signal indicating the need to provide power to the electric device.

According to a modified embodiment of the invention the uninterruptible power supply system is adapted to power the DC link using the precharge converter at switch-on of the uninterruptible power supply system, the uninterruptible power supply system comprises a main power conversion unit, which is connected to the AC power source connection, and the uninterruptible power supply system is adapted to power the DC link using the main power conversion unit after switch-on of the uninterruptible power supply system.

According to a modified embodiment of the invention the UPS system comprises an end user interface for accessing the system controller, whereby the interface is activated throughout a precharge period, and which is de-activated after the UPS system recognizes that a cold start sequence has been requested.

According to a modified embodiment the UPS system the end user interface for accessing the system controller comprises means for performing control of the UPS system alone or for performing control of a combination of multiple UPS systems and/or to perform a common system level control.

BRIEF DESCRIPTION OF DRAWINGS

These and other aspects of the invention will be apparent from and elucidated with reference to the embodiments described hereinafter.

In the drawings.

DETAILED DESCRIPTION OF THE INVENTION

Figure 1:
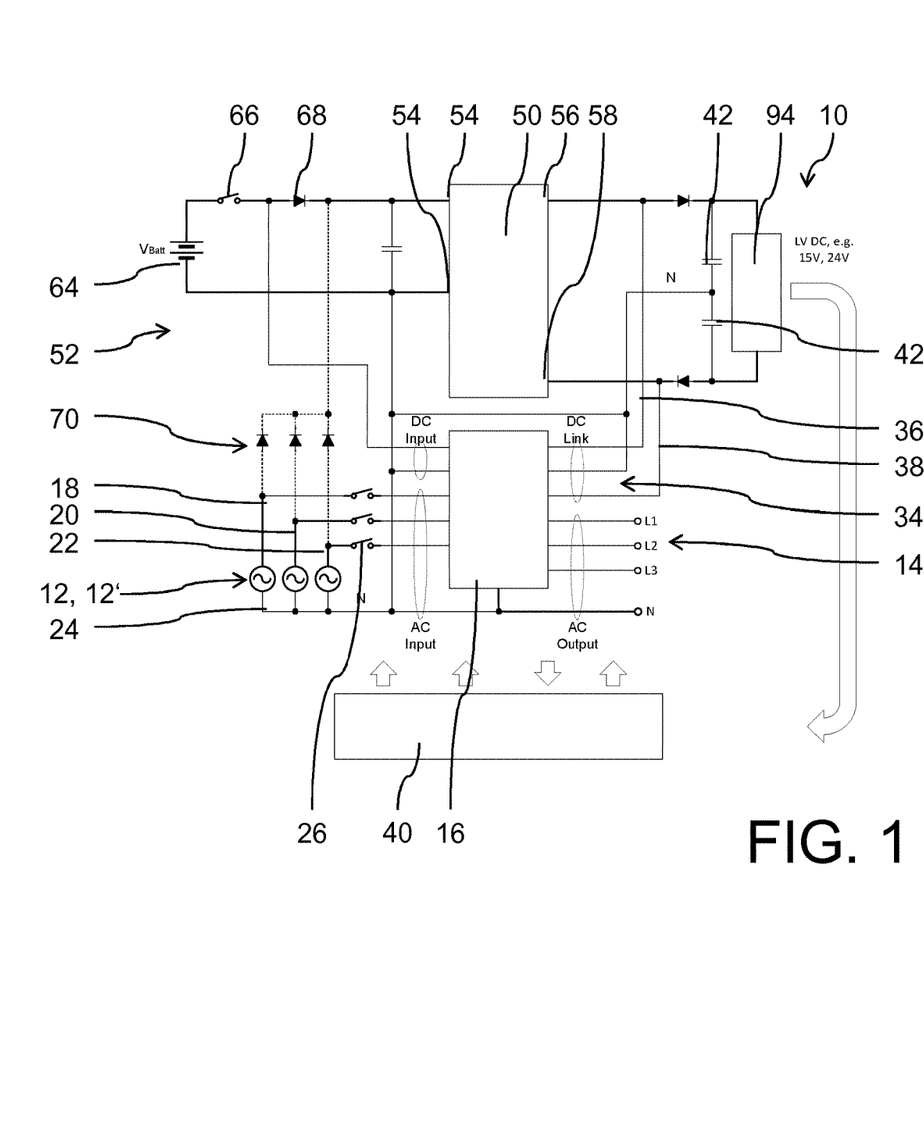
FIG. 1 shows a diagram of a generic uninterruptable power supply system with a precharge converter according to a first embodiment.

FIG. 1 shows an uninterruptible power supply (UPS) system 10 according to a first embodiment. The UPS system 10 comprises an AC power source connection 12 for providing AC input power by an AC power source 12' to the UPS system, an AC output 14, and a UPS power conversion unit 16, which connects the AC power source connection 12 and the AC output 14. The AC power source 12' in this embodiment is a 3 phase 4-wire power grid, where three wires 18, 20, 22 correspond to the three phases, and one wire 24 corresponds to neutral. Between the AC power source connection 12 and the UPS power conversion unit 16 a set of power switches 26 are provided. The AC power source 12' in this embodiment is implemented as an AC grid.

The UPS power conversion unit 16 provides the required power to the AC output 14 from the AC power source 12'. Alternatively, power can be provided from a DC power supply or a DC energy storage 64 connected by a DC power supply connection 52 to the UPS system. For example, in the case of a failure of the AC power source 12' power is supplied by the DC energy storage 64, which might be a battery. Details are discussed below. As can be seen in detail e.g. in FIG. 2, the UPS power conversion unit 16 in this embodiment comprises an AC-DC converter 28, a DC-AC converter 30, a primary DC-DC converter 96, and a secondary DC-DC converter 32. The secondary DC-DC converter 32 connected between the AC-DC converter 28 and the DC-AC converter 30. The secondary DC-DC converter 32 is connected to a DC link 34 of the UPS system 10, which comprises two DC bus lines 36, 38, which are both coupled to neutral 24 as common reference point, for example by capacitors. The input of primary DC-DC converter 96 is connected to the DC power supply connection 52, and the output of primary DC-DC converter 96 is connected to one of the DC bus lines 36, 38 and the common reference point 24. The functionality of primary DC-DC converter 96 is to charge and discharge upper DC link energy to and from, respectively, the battery 64 of the DC energy storage, as discussed below. The functionality of the secondary DC-Dc converter 32 is an energy equalizer to balance upper and the lower DC-link voltages.

Figure 2:
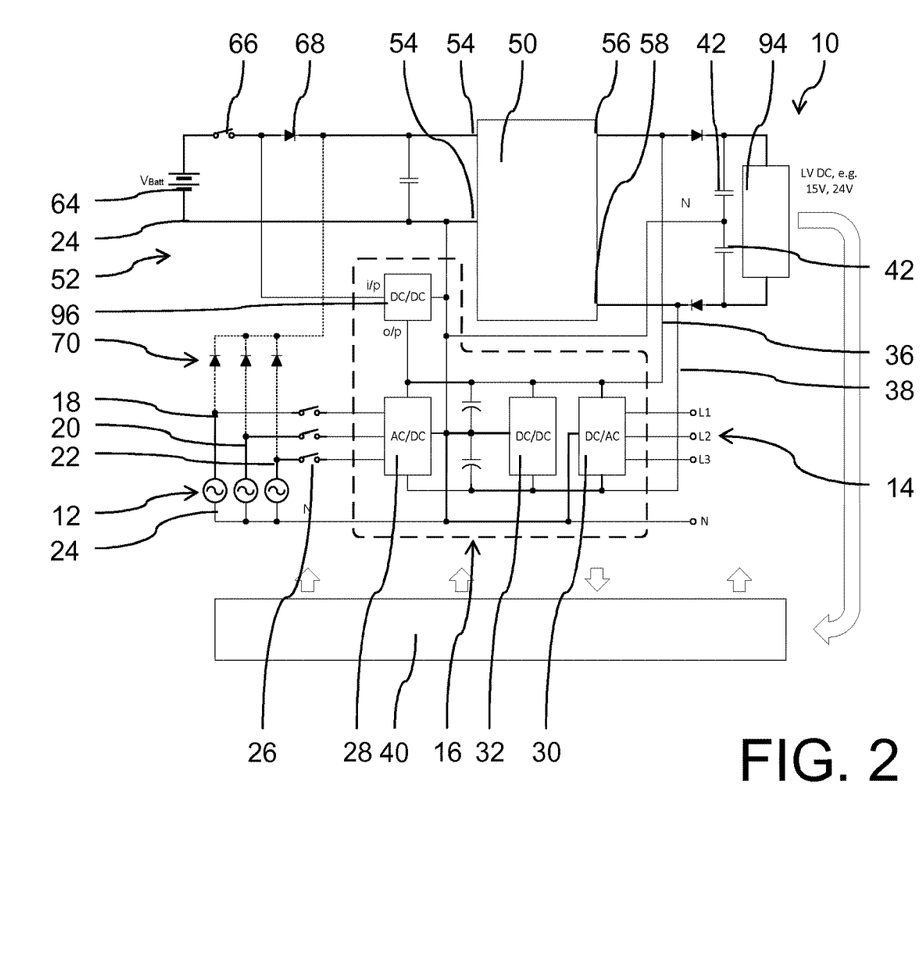
FIG. 2 shows a diagram of the generic uninterruptable power supply system with the precharge converter according to FIG. 1 with its UPS power conversion unit shown in detail.

The DC link 34 provides power to a system controller 40 of the UPS system 10. Storage capacitors 42 are coupled between neutral 24 and each DC bus line 36, 38. An auxiliary power supply 94 for the system controller 40 of the UPS system 10 is connected to the DC link 34.

The UPS system 10 further comprises a precharge converter 50. The precharge converter 50 connects the DC power supply connection 52 to the DC link 34. Accordingly, the precharge converter 50 comprises two power connectors 54 for connecting to the DC power supply connection 52 and a first and a second output connector 56, 58 for connecting to the first and the second DC bus line 36, 38, respectively.

Figure 3:
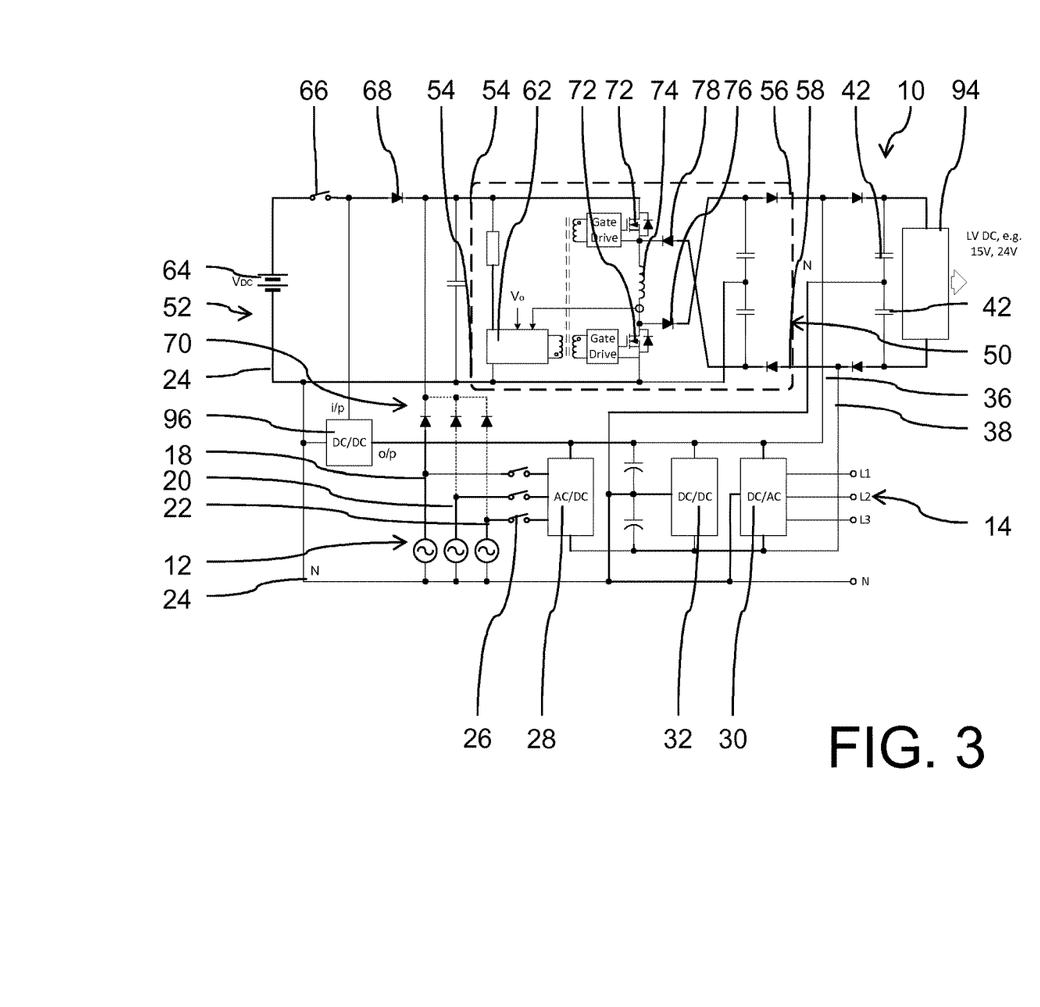
FIG. 3 shows a diagram of the generic uninterruptable power supply system with the precharge converter according to FIG. 3 with its precharge converter shown in detail.
Figure 4:
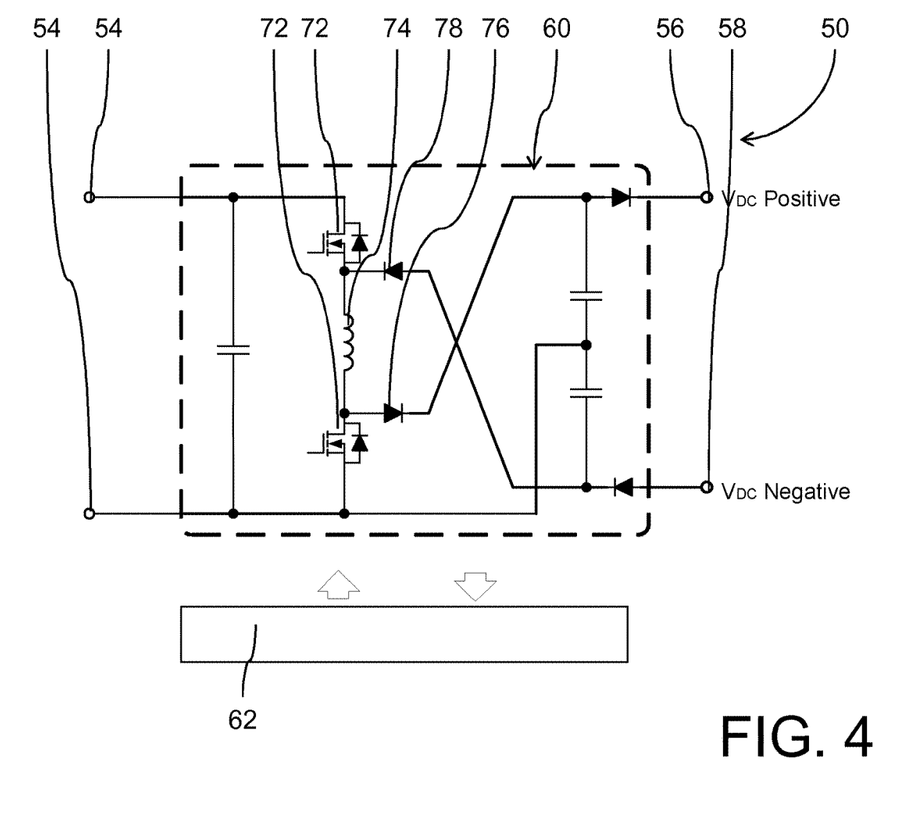
FIG. 4 shows a schematic diagram of the precharge converter according to the first embodiment shown in FIG. 3.

The precharge converter 50 of the first embodiment can be seen in detail in FIGS. 3 and 4. The precharge converter 50 comprises a converter circuit 60 for receiving DC power from the power connectors 54 and providing DC power to the first and second output connector 56, 58. As can be seen in FIGS. 3 and 4, the first and second output connector are connected to the first and second DC bus line 36,38, respectively, and are both coupled to the neutral 24 by capacitors. As discussed later in more detail, the converter circuit 60 is adapted to provide positive DC voltage to the first output connector 56 and negative DC voltage to the second output connector 58.

The precharge converter 50 further comprises a control unit 62 for controlling operation of the converter circuit 60 to provide power to the first and second output connector 56, 58 at the same time by applying pulse width modulation (PWM). The control unit 62 is connected to the power connectors 54 for receiving operational power.

The DC energy source comprises a battery 64. As can be seen in FIG. 3, neutral 24 of the AC power source 12' is connected to battery 64 minus. The battery is connected via a manual switch 66 and a diode 68 to the precharge converter 50.

In a modified embodiment the DC power supply connection 52 comprises a rectifier 70, which is connected to the AC power source connection 12. The rectifier 70 provides DC power in parallel to the battery 64. The rectifier 70 is optional, as indicated by the dashed line connecting the rectifier 70 to the AC power source connection 12 and the precharge converter 50.

The converter circuit 60 according to the first embodiment comprises two semiconductor switches 72, which are provided as FETs, one inductor element 74, and a first and a second diode 76, 78. The two semiconductor switches 72 and the inductor element 74 are connected in series with the inductor element 74 connected between the two semiconductor switches 72. The first diode 76 connects a first terminal of the inductor element 74 with the first output connector 56, the second diode 78 connects a second terminal of the inductor element 74 with the second output connector 58. The control unit 62 controls the two semiconductor switches 72 so that the first and second output connector 56, 58 are charged with energy at the same time by the inductor element 74.

Figure 5:
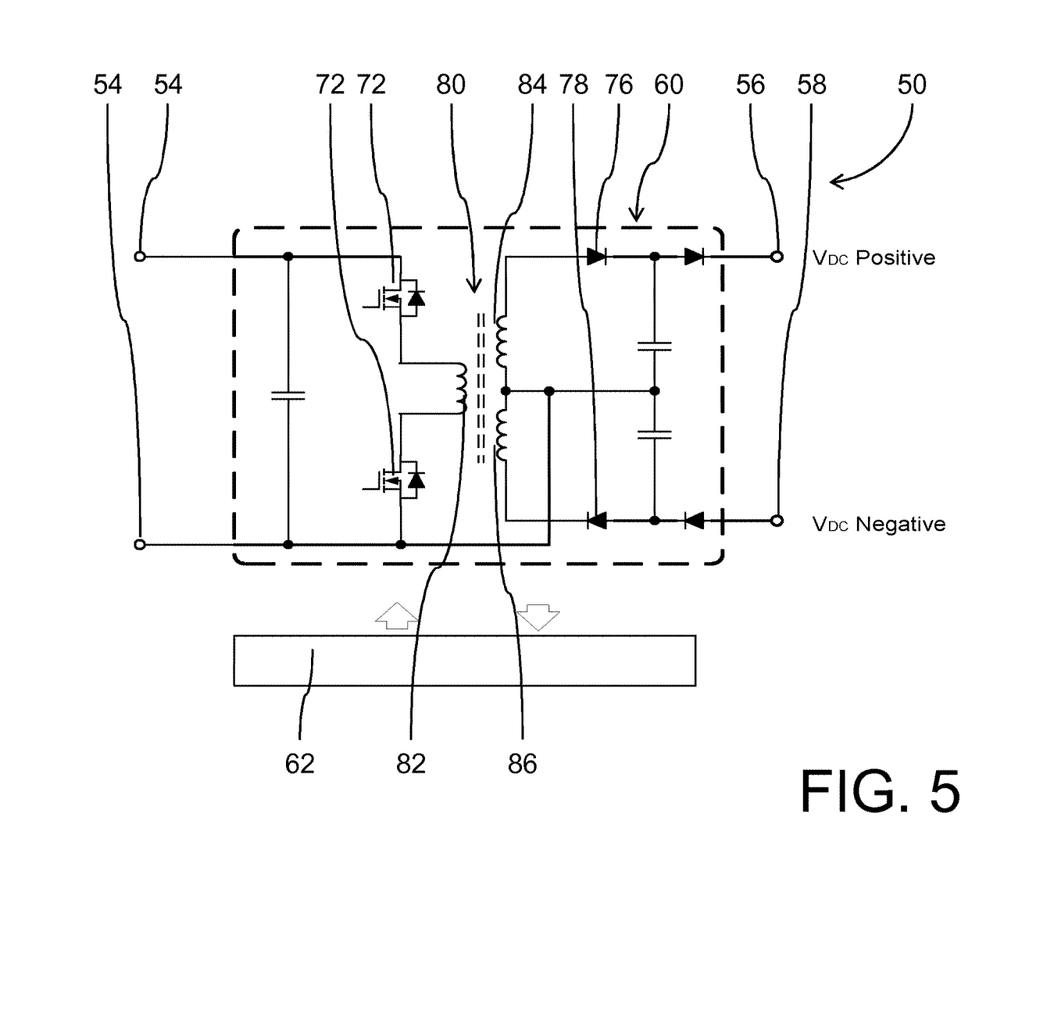
FIG. 5 shows a schematic diagram of a precharge converter according to a second embodiment.

FIG. 5 shows a precharge converter 50 according to a second embodiment. The precharge converter 50 can be used in the UPS system 10 according to the first embodiment by replacing the precharge converter 50 according to the first embodiment. Accordingly, a description of the UPS system 10 according to the second embodiment can be omitted.

The precharge converter 50 according to the second embodiment comprises in accordance with the precharge converter 50 according to the first embodiment two power connectors 54, a first and second output connector 56, 58, a converter circuit 60, and a control unit 62.

The converter circuit 60 according to the second embodiment comprises two semiconductor switches 72, a high frequency transformer 80 having one primary coil 82 and two secondary coils 84, 86, and a first and a second diode 76, 78, whereby the two semiconductor switches 72 and the primary coil 82 of the high frequency transformer 80 are connected in series. The primary coil 82 is connected between the two semiconductor switches 72. The first diode 76 connects a first of the secondary coils 84 with the first output connector 56 and the second diode 78 connects a second of the secondary coils 86 with the second output connector 58. The control unit 62 controls the two semiconductor switches 72 so that the first and second output connector 56, 58 are charged with energy at the same time by the high frequency transformer 80.

Figure 6:
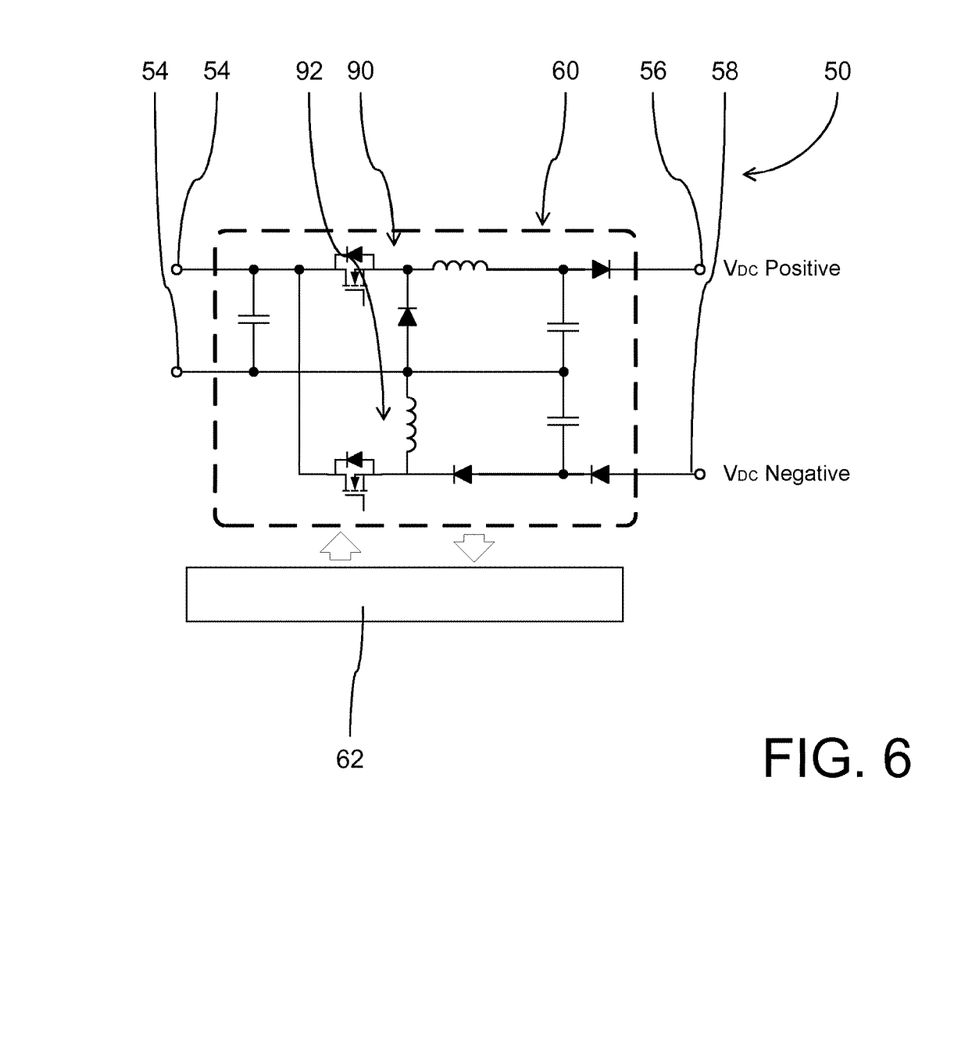
FIG. 6 shows a schematic diagram of a precharge converter according to a third embodiment.

FIG. 6 shows a precharge converter 50 according to a third embodiment. The precharge converter 50 can be used in the UPS system 10 according to the first embodiment by replacing the precharge converter 50 according to the first embodiment. Accordingly, a description of the UPS system 10 according to the third embodiment can be omitted.

The precharge converter 50 according to the third embodiment comprises in accordance with the precharge converter 50 according to the first embodiment two power connectors 54, a first and second output connector 56, 58, a converter circuit 60, and a control unit 62.

The converter circuit 60 according to the third embodiment comprises a first and a second DC-DC converter 90, 92. The first DC-DC converter 90 is connected to the first output connector 56, and the second DC-DC converter 92 is connected to the second output connector 58. The first DC-DC converter 90 in this embodiment is a buck converter, and the second DC-DC converter 92 is a buck-boost converter. The two DC-DC converters 90, 92 are controlled by the control unit 62 to individually provide each output connector 56, 58 with power.

Next, the operation of the UPS system 10 in general will be described. Since the operation is identical for all embodiments, only one generic description is given below.

It is assumed that initially the AC power source 12 is disconnected by means of the power switches 26. Also the precharge converter 50 is not active, since switch 66 is open.

In a first step, switch 66 is closed to provide power from the battery 64 via diode 68 to the precharge converter 50. Alternatively, switch 66 can be permanently closed, so that this step can be omitted.

In a second step, the precharge converter 50 is operated from the battery 64 to charge the DC link 34 to a desired voltage value.

In a third step, which might be in parallel to the second step, the storage capacitors 42, which are located prior to the auxiliary power supply 94, are powered up via DC link 34. This sequence is valid in precharging mode, i.e. at start-up of the UPS system 10, and normal operating mode of the UPS system 10.

In a fourth step, the system controller 40 is activated with the power received from the auxiliary power supply 94: Furthermore, the system controller 40 controls the primary DC-DC converter 96 and the secondary DC-DC converter 32.

In a fifth step, the primary DC-DC converter 96 starts powering one of the DC bus lines 36, 38, and the secondary DC-DC converter 32 starts voltage balancing of the DC bus lines 36, 38 to formulate the DC link 34. Since the precharge circuit 50 is primarily used in cases of blackout or abnormal function of the ac power source 12', the battery 64 can still be the energy source in the normal operation after the DC precharging sequence, e.g. after performing steps 1 to 5.

In a sixth step, the precharge converter 50 is deactivated and unpowered.

In case of blackout or failure of the AC power source 12', the battery 64 can still be the energy source for operating the UPS power conversion unit in the normal operation.

Moreover, when AC power source 12' is in normal operation, the power switches 26 can be closed to connect the UPS power conversion unit 16 to the AC power source 12'. Hence, the UPS power conversion unit 16 can be powered from the AC power source 12'.

If the AC power source 12' is available and regular, the precharge converter 50 can alternatively be activated and powered by the AC power source 12' via the rectifier 70. Hence, the system controller 40 closes the power switches 26 to connect the UPS power conversion unit 16 to the AC power source 12' after the system controller 40 is activated with the power received from the auxiliary power supply 94.

When the AC power source 12' is available and regular, the battery 64 can be charged by the UPS power conversion unit 16. Accordingly, the primary DC-DC converter 96 of the UPS power conversion unit 16 provides power for charging the battery 64, and the secondary DC-DC converter 32 balances voltage of DC bus lines 36, 38.

In a further embodiment of the uninterruptible power supply system 10 a filter is added to the DC power supply connection 52. Such a filter might be an inductor inserted into the connection between the battery 64 and the the precharge converter. For example, the filter inductor is inserted into the connection directly in front of the precharge converter 50.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 10 uninterruptible power supply (UPS) system
12 AC power source connection
12' AC power source, e.g. AC power grid
14 AC output
16 UPS power conversion unit
18 wire
20 wire
22 wire
24 neutral, common reference point
26 power switch
28 AC-DC converter
30 DC-AC converter
32 secondary DC-DC converter
34 DC link
36 DC bus line
38 DC bus line
40 system controller
42 storage capacitor
50 precharge converter
52 DC power supply connection
54 power connector
56 first output connector
58 second output connector
60 converter circuit
62 control unit
64 DC energy storage, e.g. battery
66 switch
68 diode
70 rectifier
72 semiconductor switch
74 inductor element
76 first diode
78 second diode
80 high frequency transformer
82 primary coil
84 first secondary coil
86 second secondary coil
90 first DC-DC converter
92 second DC-DC converter
94 auxiliary power supply
96 primary DC-DC converter

The invention claimed is:

1. An uninterruptible power supply system comprising
an AC power source connection for providing AC input power by an AC power source to the uninterruptible power supply system,
a DC link, which comprises a first and a second DC bus line, which are both coupled to a common reference point, where the common reference point is connectable to the AC power source neutral,
a DC power supply connection connectable to a DC energy storage,
a primary DC-DC converter for transferring power between the DC energy storage and the DC link wherein
a precharge converter with power connectors on its input side, which power connectors are connected to the DC power supply connection, and with a first and a second output connector connected to the first and the second DC bus line,
the precharge converter further comprises a converter circuit for receiving DC power from the power connectors and providing DC power to the first and second output connector, and
a control unit for controlling operation of the converter circuit,
wherein one power connector of the power connectors is connected to the common reference point, and
the converter circuit is controlled by the control unit to provide power to the output connectors at the same time with reference to the common reference point.

2. The uninterruptible power supply system according to claim 1,
wherein
the converter circuit comprises at least one semiconductor switch in series with an inductor element, and
the control unit is adapted to control the at least one semiconductor switch in series with the inductor element to perform pulse width modulation switching.

3. The uninterruptible power supply system according to claim 1,
wherein
the converter circuit comprises two semiconductor switches, one inductor element, and a first and a second diode,
whereby
the two semiconductor switches and the inductor element are connected in series with the inductor element connected between the two semiconductor switches,
the first diode connects a first terminal of the inductor element with the first output connector,
the second diode connects a second terminal of the inductor element with the second output connector, and
the first and second output connector are charged with energy at the same time by the inductor element.

4. The uninterruptible power supply system according to claim 1,
wherein
the converter circuit comprises at least one semiconductor switch, a high frequency transformer having one primary coil and at least one secondary coil, and at least one diode,
whereby
the at least one semiconductor switch and the primary coil of the high frequency transformer are connected in series,
the at least one diode connects the at least one secondary coil with the first output connector, and/or
the at least one diode connects the at least one secondary coil with the second output connector,
the first and second output connector are charged with energy at the same time by the high frequency transformer.

5. The uninterruptible power supply system according to claim 1,
wherein
the converter circuit comprises a first and a second DC-DC converter, whereby
the first DC-DC converter is connected to the first output connector, and
the second DC-DC converter is connected to the second output connector.

6. The uninterruptible power supply system according to claim 5, wherein
the first DC-DC converter is a buck converter.

7. The uninterruptible power supply system according to claim 5,
wherein
the second DC-DC converter is a buck-boost converter.

8. The uninterruptible power supply system according to claim 1,
wherein
the control unit is connected to the power connectors for receiving operational power.

9. The uninterruptible power supply system according to claim 1,
wherein
the converter circuit is adapted to provide positive DC power to the first output connector and negative DC power to the second output connector.

10. The uninterruptible power supply system according to claim 1,
wherein
the DC energy storage comprises a battery.

11. The uninterruptible power supply system according to claim 1,
wherein
the DC power supply connection comprises a rectifier, which is connected to the AC power source connection.

12. The uninterruptible power supply system according to claim 1,
wherein
the uninterruptible power supply system comprises a system controller for controlling the operation of the uninterruptible power supply system, whereby the control unit of the precharge converter is provided separately from the system controller.

13. The uninterruptible power supply system according to claim 1,
wherein
the uninterruptible power supply system is adapted to power the DC link using the precharge converter at switch-on of the uninterruptible power supply system,
the uninterruptible power supply system comprises a main power conversion unit, which is connected to the AC power source connection, and
the uninterruptible power supply system is adapted to power the DC link using the main power conversion unit after switch-on of the uninterruptible power supply system.

14. The uninterruptible power supply system according to claim 1,
wherein
the precharge converter is deactivated and unpowered after switch-on of the uninterruptible power supply system.

15. The uninterruptible power supply system according to claim 2,
wherein
the converter circuit comprises two of the at least one semiconductor switch, one inductor element, and a first and a second diode,
whereby
the two semiconductor switches and the inductor element are connected in series with the inductor element connected between the two semiconductor switches,
the first diode connects a first terminal of the inductor element with the first output connector,
the second diode connects a second terminal of the inductor element with the second output connector, and
the first and second output connector are charged with energy at the same time by the inductor element.

16. The uninterruptible power supply system according to claim 2,
wherein
the converter circuit comprises a high frequency transformer having one primary coil and at least one secondary coil, and at least one diode,
whereby
the at least one semiconductor switch and the primary coil of the high frequency transformer are connected in series,
the at least one diode connects the at least one secondary coil with the first output connector, and/or
the at least one diode connects the at least one secondary coil with the second output connector,
the first and second output connector are charged with energy at the same time by the high frequency transformer.

17. The uninterruptible power supply system according to claim 3,
wherein
the converter circuit comprises a high frequency transformer having one primary coil and at least one secondary coil, and at least one diode,
whereby
the two semiconductor switches and the primary coil of the high frequency transformer are connected in series,
the at least one diode connects the at least one secondary coil with the first output connector, and/or
the at least one diode connects the at least one secondary coil with the second output connector,
the first and second output connector are charged with energy at the same time by the high frequency transformer.

18. The uninterruptible power supply system according to claim 2,
wherein
the converter circuit comprises a first and a second DC-DC converter,
whereby
the first DC-DC converter is connected to the first output connector, and
the second DC-DC converter is connected to the second output connector.

19. The uninterruptible power supply system according to claim 3,
wherein
the converter circuit comprises a first and a second DC-DC converter,
whereby
the first DC-DC converter is connected to the first output connector, and
the second DC-DC converter is connected to the second output connector.

20. The uninterruptible power supply system according to claim 4,
wherein
the converter circuit comprises a first and a second DC-DC converter,
whereby
the first DC-DC converter is connected to the first output connector, and
the second DC-DC converter is connected to the second output connector.

21. The uninterruptible power supply system according to claim 1, wherein
the common reference point is a neutral wire of an AC power source,
whereby
the AC power source is a 3-phase 4-wire AC power source.

22. The uninterruptible power supply system according to claim 1,
wherein
the common reference point is one common point voltage of the UPS system, which is a middle point of the DC-link,
whereby
the AC power source is a 3-phase 3-wire power source.

* * * * *